(12) United States Patent
Iso et al.

(10) Patent No.: US 6,652,148 B2
(45) Date of Patent: Nov. 25, 2003

(54) ROLLING BEARING

(75) Inventors: Kenichi Iso, Kanagawa (JP); Hiromichi Takemura, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/981,723

(22) Filed: Oct. 19, 2001

(65) Prior Publication Data

US 2002/0076125 A1 Jun. 20, 2002

(30) Foreign Application Priority Data

Oct. 19, 2000 (JP) ..................... P.2000-319623
Jul. 16, 2001 (JP) ..................... P.2001-215409

(51) Int. Cl.⁷ .............................. F16C 33/66
(52) U.S. Cl. ..................................... 384/462
(58) Field of Search ................. 384/462, 484, 384/476, 490, 548

(56) References Cited

U.S. PATENT DOCUMENTS 6,004,039 A * 12/1999 Yabe et al. .................. 384/463
6,109,794 A * 8/2000 Bertetti et al. ............... 384/462

FOREIGN PATENT DOCUMENTS

| JP | 2878749 | 1/1999 |
| JP | 11-72120 | 3/1999 |

OTHER PUBLICATIONS

P. Schatzberg, et al.; "Effects of Water and Oxygen During Rolling Contact Lubrication" Wear; 12; pp. 331–342; 1968.

Kyozo Furumura, et al.; "The Surface–Initiated and Subsurface–Initiated Rolling Contact Fatigure"; NSK Bearing Journal; No. 636, pp. 1–10; 1977.

* cited by examiner

Primary Examiner—Lenard A. Footland
(74) Attorney, Agent, or Firm—Sughrue Mion, PLLC

(57) ABSTRACT

A rolling bearing includes a plurality of rolling elements rotatably retained at substantially uniform intervals between inner and outer rings via a retainer, and a grease composition which contains a conductive substance in the proportion of 0.1 to 10 wt % and is sealed in the rolling bearing.

11 Claims, 4 Drawing Sheets

ROLLING BEARING

BACKGROUND OF THE INVENTION

The present invention relates to a rolling bearing having a grease composition sealed therein. More particularly, the present invention relates to a rolling bearing which is to be used under high-temperature, high-speed, and heavy-load conditions and is suitable for use in an area susceptible to intrusion of water; for example, automobile electrical equipment, an alternator or intermediate pulley which is auxiliary equipment of an engine, an electromagnetic clutch for an automobile air conditioner, a water pump, an electromagnetic clutch for a gas heat pump, or a compressor.

Intrusion of water into a lubricant usually results in a great drop in the durability and life of a rolling bearing. For instance, it is reported that intrusion of water into lubricating oil (Turbine oil #180) in an amount of 6% results in a drop in rolling fatigue strength to as low as one-twentieth that achieved when nothing is mixed in a lubricating oil [see "About Rolling Fatigue Arising in Surface Starting Point and in Internal Starting Point" by Kyozo FURUMURA, Shiniichi SHIROTA, and Kiyoshi HIRAKAWA, NSK Bearing Journal, No. 636, pp. 1 through 10, 1977]. Schatzber et al. have also reported that intrusion of water into lubricating oil in an amount as low as 100 ppm results in a drop in rolling strength of steel as high as 32 to 48% (P. Schatzberg. I. M. Felsen, "Effects of Water and Oxygen During Rolling Contact Lubrication on Wear," No. 12, pp. 331 through 342, 1968).

In many cases, each of the above-described component bearings is used at high temperature and high speed as well as under heavy load. As described in Japanese Patent Publication No. 2878749, oxygen sometimes develops as a result of decomposition of grease. The bearing is employed as an auxiliary belt-drive bearing disposed outside an engine. Hence, the bearing is susceptible to intrusion of muddy water or rainwater splashed from a road surface. A water-pump bearing is also susceptible to intrusion of circulating water for cooling the engine. These bearings are usually constructed so as to prevent intrusion of water from the outside, by means of a contact rubber seal. However, complete prevention of intrusion of water has not yet been achieved. The automobile engine is a machine which is to be repeatedly activated and deactivated. When the bearing is in an inoperative state, the internal temperature of a housing of the bearing drops. When the temperature has reached the dew point, moisture content in air surrounding the bearing condenses to water droplets. The water droplets often adhere to the bearing or intrude into a lubricant. As described in Japanese Patent Unexamined Publication No.Hei 11-72120, hydrogen originating from the thus-intruded water enters into steel of the bearing, thereby inducing exfoliation while involving occurrence of white-etching-constituent structural changes stemming from hydrogen embrittlement.

Each of the component bearings is rotated by a belt and pulley. Static electricity develops between the belt and the pulley. Inner and outer rings are usually insulated from each other by means of an oil film of lubricant during the course of rotation of a bearing. However, when metal contact has arisen for reasons of strong vibration, electrical continuity is established momentarily, thereby inducing occurrence of a great potential difference between the inner and outer rings. The resultant D.C. voltage induces electrolysis of water, thereby accelerating generation of hydrogen ions. As a result, a bearing becomes susceptible to exfoliation while involving occurrence of white-etching-constituent structural changes such as those mentioned above.

As mentioned above, each of the component bearings is susceptible to exfoliation while involving occurrence of white-etching-constituent structural changes due to hydrogen embrittlement stemming from intrusion of water from the outside. Further, exfoliation is accelerated by static electricity. Prevention of acceleration of exfoliation has posed a new important challenge.

SUMMARY OF THE INVENTINON

Accordingly, it is an object of the present invention to provide a rolling bearing with life which is used at high temperature and high speed and under heavy load and prevents exfoliation, which would otherwise be caused while involving white-etching-constituent structural changes due to hydrogen embrittlement when water has entered the bearing from the outside.

The object, a rolling bearing according to the present invention comprising an inner ring, an outer ring, a plurality of rolling elements rotatably retained between the inner and outer rings and a grease composition which contains a conductive substance in the range from 0.1 wt % to 10 wt % and is sealed in a bearing space defined by the inner and outer rings and the rolling elements.

In particular, in the above-mentioned structure it is advantageous that the plurality of rolling elements are rotatably retained at substantially uniform intervals between the inner and outer rings via the retainer.

In particular, in the above-mentioned structure it is advantageous that the grease composition contains a conductive substance in the range from 0.5 wt % to 5 wt %.

In particular, in the above-mentioned structure it is advantageous that the total amount of additives is usually determined so as to become 20 wt % or less of the overall amount of the grease composition.

In particular, in the above-mentioned structure it is advantageous that the conductive substance comprises carbon black.

In particular, in the above-mentioned structure it is advantageous that a mean particle size of the carbon black ranges from 10 to 300 nm.

In particular, in the above-mentioned structure it is advantageous that the conductive substance comprises carbon nanotube.

In particular, in the above-mentioned structure it is advantageous that the carbon nanotube has a diameter of 0.5 to 15 nm and an overall length of 0.5 to 50 $\mu$m.

As mentioned above, generation of hydrogen ions is accelerated by means of electrolysis of water induced by static electricity developing between a belt and a pulley. However, the thus-developing static electricity is energized at all times by means of a conductive substance contained in grease. Hence, a potential difference developing between the inner and outer rings is substantially obviated, thereby preventing occurrence of electrolysis of water. This in turn suppresses generation of and progress in exfoliation involving occurrence of white-etching-constituent structural changes.

DETAILED DESCRIPTION OF THE PREFERRED EMBODIMENT

A preferred embodiment of rolling bearing according to the present invention will be described in more detail hereinbelow.

Figure 1:
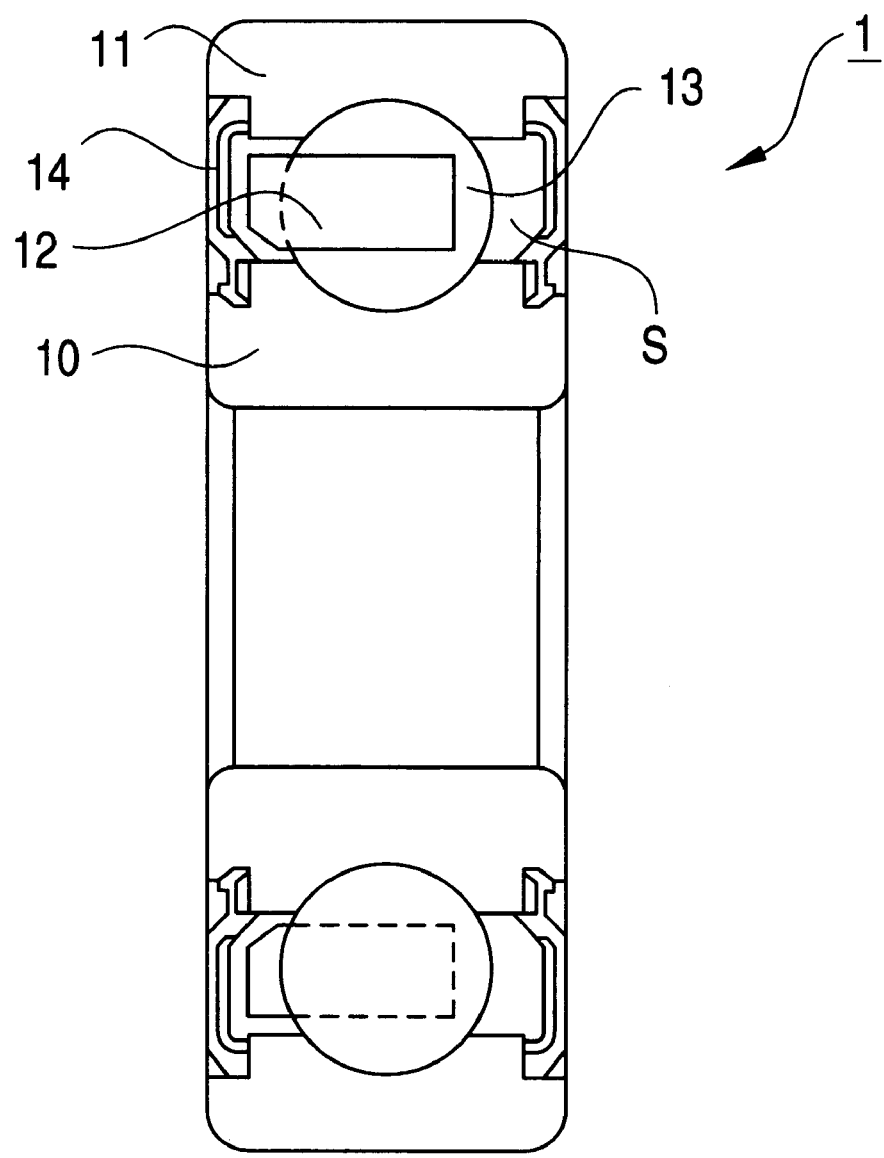
FIG. 1 is a cross-sectional view showing an embodiment of a rolling bearing according to the present invention.

No particular limitations are imposed on the structure of the rolling bearing according to the present invention. For example, a ball bearing 1 shown in FIG. 1 in the form of a cross section can be illustrated as an example structure of the rolling bearing. The rolling bearing 1 retains a plurality of balls 13, which serve as rolling elements, at substantially uniform intervals between an inner ring 10 and an outer ring 11 via a retainer 12. A space(a bearing space) S defined among the inner ring 10, the outer ring 11, and the balls 13 is filled with a predetermined amount of grease composition (not shown) to be described later. The grease composition is sealed with a seal 14.

[Base Oil]

A base oil used in a grease composition is not limited to any particular type; all types of oils commonly used as base oils for lubricating oil can be used. Preferably, in order to avoid occurrence of unusual noise, which would otherwise be caused at cold start for reasons of deficiency in cold fluidity, or occurrence of seizing, which would otherwise be caused by difficulty in formation of an oil film at high temperature, at 40° C., a base oil has a kinematic viscosity of, preferably, 10 to 400 mm$^2$/sec., more preferably 20 to 250 mm$^2$/sec., much further preferably 40 to 150 mm$^2$/sec.

More specifically, lubricating oils, such as petroleum-based lubricating oils, synthetic-fluid-based lubricating oils, and natural-oil-based lubricating oils, can be mentioned. The petroleum can be used after having been refined through appropriate combinations of vacuum distillation, oil deasphalting, solvent extraction, hydrocracking, solvent dewaxing, sulfuric acid cleansing, clay refining, and hydrofinishing. As the synthetic-oil-based lubricating oils, there can be mentioned a hydrocarbon-based oil, an aromatic-series-based oil, an. ester-based oil, and an ether-based oil. As the hydrocarbon-based oil, there can be mentioned poly-α-olefin, such as normal paraffin, iso-paraffin, polybutene, polyisobutylene, 1-decenoic oligomer, and 1-decenoic-ethylene-cooligomer, or hydrides thereof. As the aromatic oil, there can be mentioned alkylbenzene, such as monoalkylbenzene and dialkylbenzene, and alkylnaphthalene, such as monoalkylnaphthalene, dialkylnaphthalene, and polyalkylnaphthalene. As the ester-based oil, there can be mentioned diester oil, such as dibutylsebacate, di-2-ethylhexylsebacate, dioctyladipate, diisodecileadipate, ditridecilarate, ditridecilglutarate, and methylacetylcinoleate; aromatic ester oil, such as trioctyl trimellitate, tridecyltrimellitate, and tetraoctylpyromellitate; polyolester oil, such as trimethylolpropane caprylate, trimethylolpropanepelargonate, pentaerythritol-2-ethlhexanoate, and pentaerythritol pelargonate; and complex ester oil which is an oligoester consisting of polyatomic alcohol and mixed fatty acid of dibasic-acid/monobasic-acid. As the ester oil, there can be mentioned, polyglycol, such as polyethylene glycol, polypropylene glycol, polyethylene glycol monoether, polypropylene glycol monoether; and phenyl ether oil, such as monoalkyltriphenyleter, alkyldiphenyleter, dialkyldiphenyleter, pentaphenyleter, tetraphenyleter, monoalkyltetraphenyleter, and dialkyltetraphenyleter. As other synthetic lubricating oil, there can be mentioned tricresylphsphate, silicon oil, andbuffaloalkyleter. As the natural-oil-based lubricating oils, there can be mentioned beef tallow, lard, soybean oil, rape seed oil, rice bran oil, coconut oil, palm oil, palm kernel oil, and hydrides thereof. The base oil can be used solely or as a mixture and is adjusted to the previously-described desirable kinematic viscosity.

[Thickener]

No particular limitations are imposed on a thickener, so long as the thickener has a gel structure and capability of retaining a base oil into the gel structure. For example, there can be selectively used metallic soaps consisting of Li and Na; composite metallic soaps selected from Li, Na, Ba, and Ca; and non-soaps, such as benton, iliretainerl, urea compounds, urea-urethane compounds, and urethane compounds, as required. In consideration of heat resistance of a grease composition, urea compounds, urea-urethane compounds, urethane compounds, or combinations thereof are desirable. As urea compounds, urea-urethane compounds, and urethane compounds, there can be mentioned diurea compounds, triurea compounds, tetraurea compounds, polyurea compounds, urea-urethane compounds, diurethane compounds, and their mixtures. Among the compounds, dieurea compounds, urea-urethane compounds, diurethane compounds, and their mixtures are more desirable. In consideration of heat resistance and acoustic characteristic, formulation of dieurea compounds is more preferable.

[Conductive Substance]

A conductive substance is an indispensable additive in the grease composition to be sealed in the rolling bearing according to the present invention. No particular limitation is imposed on the type of the conductive substance, so long as the substance has good conductivity. Further, the conductive substance may be in liquid or solid form. Carbon black is particularly preferable, because it is easy to handle and procure and does not deteriorate lubricity. In consideration of dispersibility and acoustic characteristic of a conductive substance in a grease composition, selection of carbon black having a mean particle size of 10 to 300 nm or thereabouts is particularly preferable.

Figure 2:
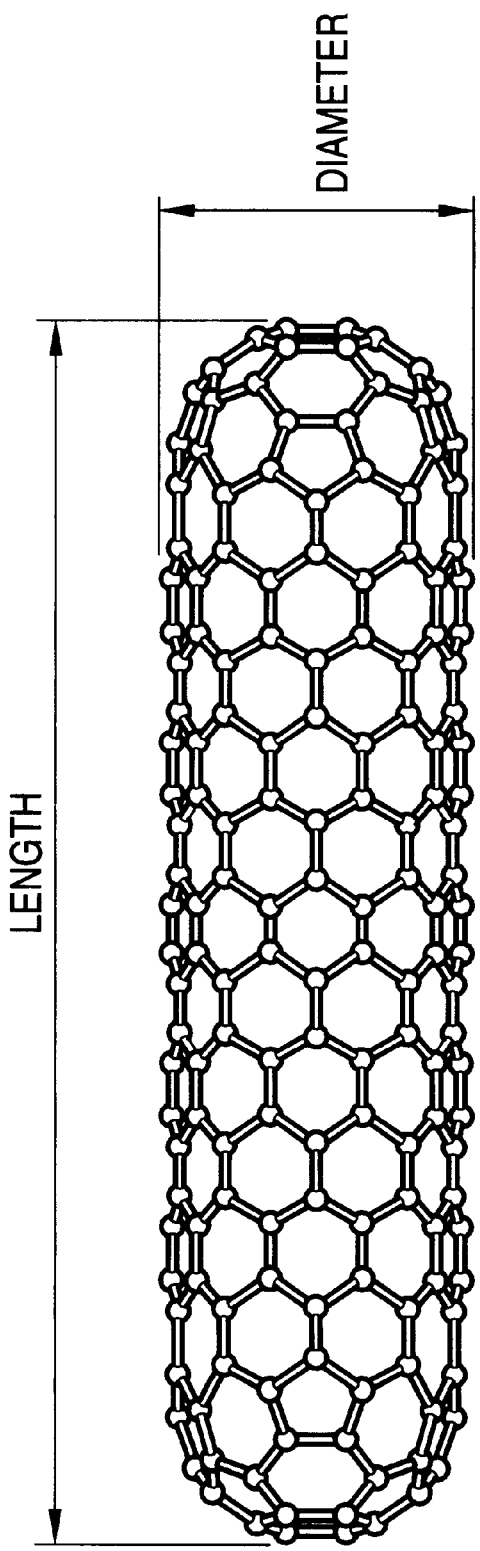
FIG. 2 is a schematic drawing of carbon nanotube.

Further, carbon nanotube can also be used as a conductive substance. As schematically shown in FIG. 2, the carbon nanotube is a tube-like carbon polyhedron which is formed by means of rounding of a network structure of a six-membered carbon ring and has both ends closed. A junction of a tube of different diameter or a closed section at the end of the tube may assume the structure of a five-membered carbon ring or a seven-membered carbon ring. Some carbon nanotubes assume a spherical structure. For example, $C_{60}$ and $C_{70}$ have been known as fullerene, and fullerene may be employed as a conductive substance in the present invention. Carbon nanotube having a diameter of 0.5 to 15 nm and a length of 0.5 to 50 μm is particularly preferable.

(Concentration)

A desirable amount of conductive substance to be added is 0.1 to 10 wt % of the overall amount of grease composition. If the amount of conductive substance is lower than the above-described amount, the conductive substance fails to exhibit sufficient conductivity. In contrast, if the amount of conductive substance is greater than the above-described amount, grease will become hardened, in turn deteriorating the life until seizure of the bearing. For ensuring reliable conductivity and giving consideration to preventing a drop in life until seizure, the amount of conductive substance to be added preferably ranges from 0.5 to 5 wt % of the overall amount of grease composition. Moreover, grease into which conductive substance has been added preferably assumes a consistency of NLGI Nos. 1 through 3.

[Other Additives]

In order enhance lubricating performance to a much greater extent, various additives, such as an oxidation inhibitor, an extreme-pressure agent, an oily agent, a preservative, a metal deactivator, and a viscosity index improver, may be added to the grease composition solely or in combination, as required. Known additives may be employed as these additives. Moreover, no limitations are imposed on the amount of additive. The total amount of additives is usually determined so as to become 20 wt % or less of the overall amount of grease composition.

[Manufacturing Method]

No limitations are imposed on a method of preparing the grease composition. However, a grease composition is usually produced by means of causing a thickener to react with a base oil. Mixing a predetermined amount of conductive substance into the thus-produced grease composition is preferable. In this case, however, there is a necessity of sufficiently agitating the grease composition after a conductive substance has been mixed into the composition by use of a kneader or a roll mill, thereby uniformly dispersing the conductive substance. Heating is effective for the processing. Under the foregoing manufacturing method, addition of another additive, such as an oxidation inhibitor or preservative, simultaneous with addition of a conductive substance is preferable in terms of process.

EXAMPLES

The present invention will now be described in more detail by reference to examples and comparative examples. The present invention is not limited to these examples.

Example 1

A test grease was prepared so as to assume a composition shown in Table 1. First, a base oil having amine mixed therein was caused to react with a base oil having di-isocyanate mixed therein (poly-α-olefin: PAO). The mixture was agitated and heated, thereby producing a semi-solid substance. An amine-based oxidation inhibitor which had been dissolved in a base oil beforehand was added to the semi-solid substance, and the substance was sufficiently agitated. After the semi-solid substance had been annealed, carbon black (a mean particle size 30 nm) was added to the substance in various amounts ranging from 0.05 to 12 wt %. The substance was fed to a rolling mill, thus producing several test greases containing different amounts of carbon black. Here, the consistencies of the test greases were adjusted to NLGI Nos. 1 through 3.

TABLE 1

| GREASE COMPOSITION | |
| --- | --- |
| THICKENER | UREA COMPOUND |
| BASE OIL | PAO |
| KINETIC VISCOSITY OF BASE OIL ($mm^2$/sec, 40° C.) | 50 |
| CARBON BLACK | 0.05 TO 12 wt % |

(Sharp Acceleration/Deceleration Test)

Exfoliation life of the bearing was tests d by means of suddenly accelerating and decelerating a bearing incorporated in an alternators through use of an engine. Specifically, a single-row deep-slot ball bearing (having an inner diameter of 17 mm, an outer diameter of 47 mm, and a width of 14 mm) having 2.5 g of test grease sealed therein was incorporated into an alternator. The bearing was continuously rotated and tested for 500 hrs, by means of repetition of engine cycles of 1000 to 6000 $min^{-1}$ (i.e., a bearing revolving speed of 2400 to 13300 $min^{-1}$) at room temperature and under a pulley load of 1560 N. The test was terminated when vibration arose as a result of occurrence of exfoliation in the ringway surface of the outer ring of the bearing or, if no exfoliation had arisen, after 500 hours had elapsed. After the test, occurrence of internal structural changes of the bearing were also checked visually. Each of the samples was tested ten times, and the probability of occurrence of exfoliation and the probability of occurrence of structural changes were computed through use of the following equations.

Probability of occurrence of exfoliation=(number of occurrences of exfoliation/number of tests)×100

Probability of occurrence of structural change=(number of occurrences of structural change/number of tests)×100

(Seizing Test)

2.3 g of test grease was sealed in a deep-slot ball bearing having a contact rubber seal (inner diameter of 17 mm, outer diameter of 52 mm, width of 16 mm). The bearing was continuously rotated at an inner ring rotation speed of 20000 $min^{-1}$, a bearing temperature of 140° C., and a radial load of 98 N. When seizing up arose and the external bearing temperature reached 150° C. or higher, the test was terminated. Each of the samples was tested four times. A sample which required a mean time of 1000 hours or more until the external bearing temperature reached 150° C. was considered acceptable.

Figure 3:
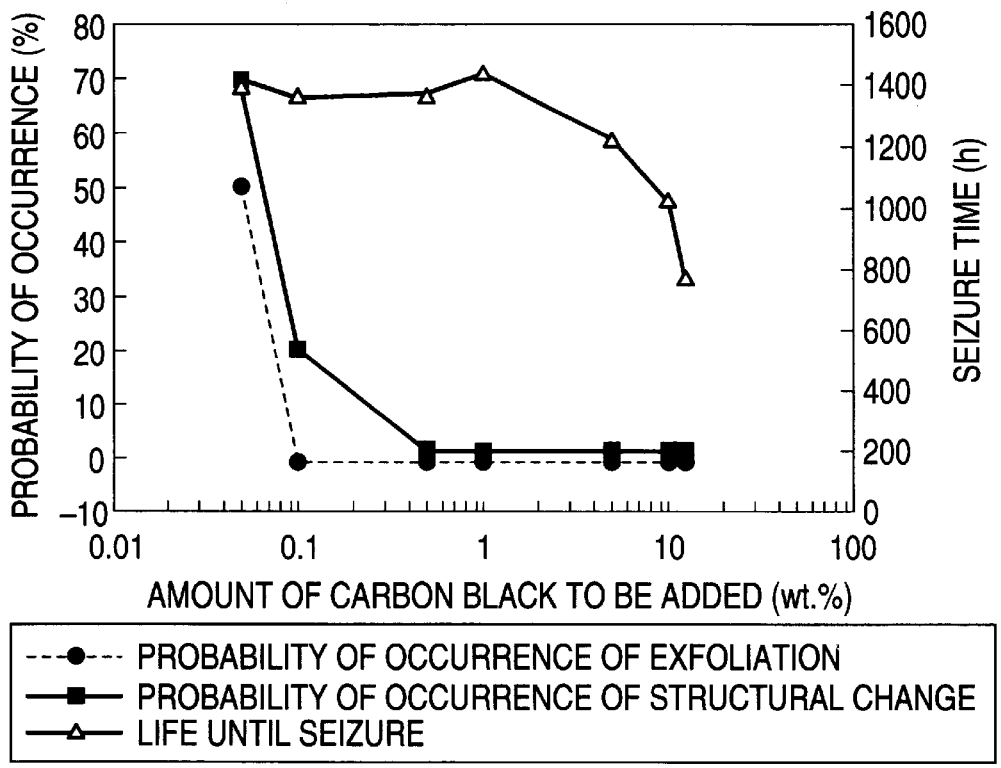
FIG. 3 is a graph showing the relationship between the amount of carbon black to be added, the probability of occurrence of exfoliation, the probability of occurrence of structural change, and life until seizure, all having been determined in Example 1.

FIG. 3 show results of the sharp acceleration/deceleration test and those of the seizing test. It is understood that, as a result of test grease being sealed into a bearing, the grease having carbon black, or a conductive substance, added within a range of 0.1 to 10 wt % therein, there was obtained a rolling bearing which involves a low probability of occurrence of exfoliation and a low probability of occurrence of structural change and which has superior life until seizure. In contrast, a bearing into which carbon black has been added in an amount of 0.1 wt % or less shows insufficient conductivity and is vulnerable to exfoliation and structural change. A bearing into which carbon black has been added in an amount of 10 wt % or more is susceptible to seizing up.

Example 2

Example 2 is similar to Example 1, except that carbon nanotube (having a diameter of 0.7 to 2 nm and an overall length of 10 to 30 μm) was employed in place of carbon black. Test greases were prepared such that the amount of carbon nanotube to be added varied within the range of 0.05 to 12 wt %. The test greases were subjected to the same sharp acceleration/deceleration test and seizing test as described above.

Figure 4:
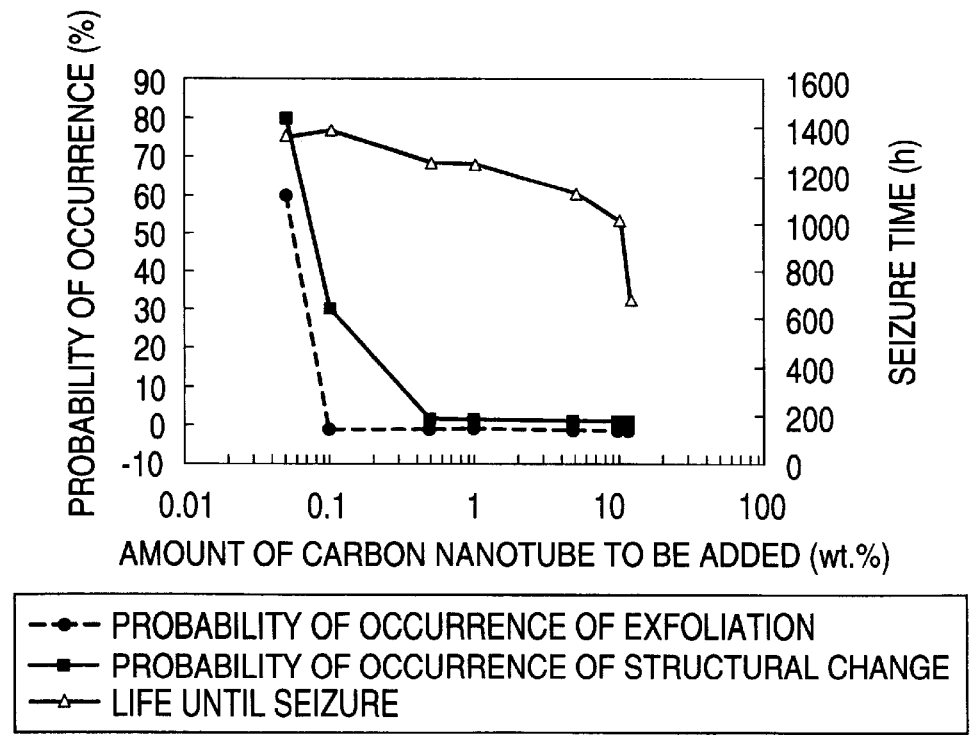
FIG. 4 is a graph showing the relationship between the amount of carbon nanotube to be added, the probability of occurrence of exfoliation, the probability of occurrence of structural change, and life until seizure, all having been determined in Example 2.

Test results are shown in FIG. 4. As in the case of carbon black, it is understood that, as a result of sealing a test grease into a bearing, the grease having carbon nanotube added in the range of 0.1 to 10 wt % therein, there is obtained a rolling bearing which involves a low probability of occurrence of exfoliation and a low probability of occurrence of structural change and which has a superior life until seizure.

Example 3

Figure 5:
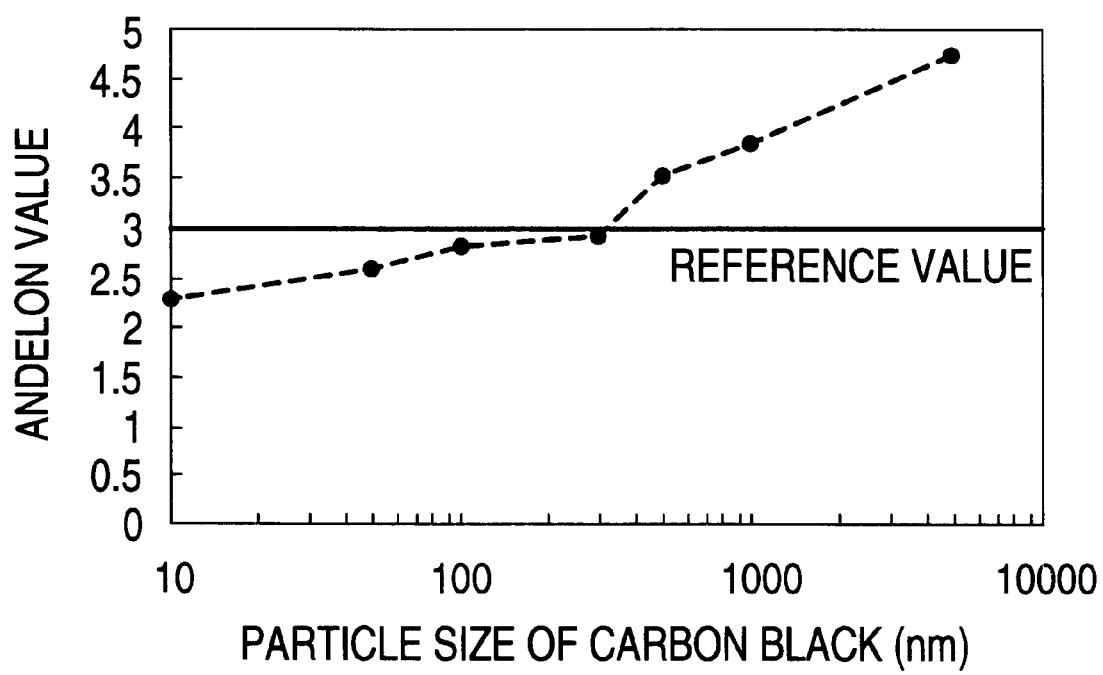
FIG. 5 is a graph showing the relationship between a particle size of carbon black and Andelon values determined in Example 3.

In compliance with Example 1, test greases were prepared by use of carbon black having different mean particle sizes ranging from 10 nm to 5 μm. In all cases, the amount of carbon black was set to 3 wt %. A single-row deep-slot ball bearing (having an inner diameter of 17 mm, an outer diameter of 47 mm, and a width of 14 mm) having 2.5 g of test grease sealed therein was rotated at an ambient temperature of 25° C., an inner ring rotating speed of 1800 mn$^{-1}$, and an axial load of 27.4 N. An Andelon value (i.e., vibration speed ranging from 1800 to 10000 Hz) obtained after two minutes had elapsed since start of bearing rotation of the bearing was measured. Each of the samples was tested ten times. A mean value of the tests is taken as a test result. A bearing which has yielded an Andelon value of 3 was considered acceptable. As can be seen from FIG. 5, it is understood that use of carbon black having a mean particle size of 10 to 300 nm results in achievement of a superior acoustic characteristic.

As has been described, the present invention yields a superior rolling bearing having a considerably superior exfoliation prevention effect. Such a rolling bearing can be suitably used in a place where a bearing is used at high temperature and high speed and under heavy load and is susceptible to intrusion of water, such as automobile electrical equipment, an alternator or intermediate pulley which is engine auxiliary equipment, an electromagnetic clutch for an automobile air conditioner, a water pump, an electromagnetic clutch for a gas heat pump, or a compressor.

What is claimed is:

1. A rolling bearing comprising:
   an inner ring;
   an outer ring;
   a plurality of rolling elements rotatably retained between said inner and outer rings; and
   a grease composition which contains a conductive substance in the range from 0.1 wt % to 10 wt % and is sealed in a bearing space defined by said inner and outer rings and the rolling elements, wherein said grease composition is in contact with said inner ring, said outer ring, and said plurality of rolling elements.

2. The rolling bearing as set forth in claim 1, wherein said plurality of rolling elements are rotatably retained at substantially uniform intervals between said inner and outer rings.

3. The rolling bearing as set forth in claim 1, wherein said grease composition contains a conductive substance in the range from 0.5 wt % to 5 wt %.

4. The rolling bearing as set forth in claim 1, wherein the total amount of additives is determined so as to become 20 wt % or less of the overall amount of said grease composition.

5. The rolling bearing as set forth in claim 1, wherein said conductive substance comprises carbon black.

6. The rolling bearing as set forth in claim 5, wherein a mean particle size of said carbon black ranges from 10 to 300 nm.

7. The rolling bearing as set forth in claim 6, wherein said carbon nanotube has a diameter of 0.5 to 15 nm and an overall length of 0.5 to 50 μm.

8. A rolling bearing comprising:
   an inner ring;
   an outer ring;
   a plurality of rolling elements rotatably retained between said inner and outer rings; and
   a grease composition which contains a conductive substance in the range from 0.1 wt % to 10 wt % and is sealed in a bearing space defined by said inner and outer rings and the rolling elements wherein said conductive substance comprises carbon nanotube.

9. The rolling bearing as set forth in claim 8, wherein said carbon nanotube has a diameter of 0.5 to 15 nm and an overall length of 0.5 to 50 μm.

10. The rolling bearing as set forth in claim 1, wherein said conductive substance comprises carbon nanotube.

11. A rolling bearing comprising:
    an inner ring;
    an outer ring;
    a plurality of rolling elements rotatably retained between said inner and outer rings; and
    a grease composition which contains a conductive substance in the range from 0.1 wt % to 10 wt % and is sealed in a bearing space defined by said inner and outer rings and the rolling elements;
    wherein said conductive substance comprises carbon black, and
    further wherein a mean particle size of said carbon black ranges from 10 to 300 nm.

* * * * *